(12) United States Patent
Frydman et al.

(10) Patent No.: US 8,354,082 B2
(45) Date of Patent: Jan. 15, 2013

(54) SYSTEM FOR HEAT INTEGRATION WITH METHANATION SYSTEM

(75) Inventors: Arnaldo Frydman, Houston, TX (US); Omprakash Mall, Bangalore (IN); Saumar Jyoti Hazarika, Bangalore (IN); Jinmesh Pranav Majmudar, Ahmedabad (IN)

(73) Assignee: General Electric Company, Schenectady, NY (US)

( * ) Notice: Subject to any disclaimer, the term of this patent is extended or adjusted under 35 U.S.C. 154(b) by 283 days.

(21) Appl. No.: 12/726,039

(22) Filed: Mar. 17, 2010

(65) Prior Publication Data

US 2011/0229382 A1    Sep. 22, 2011

(51) Int. Cl.
*B01J 8/04* (2006.01)
(52) U.S. Cl. .................... 422/630; 518/702; 518/703
(58) Field of Classification Search ............ 422/630; 518/702, 703
See application file for complete search history.

(56) References Cited

U.S. PATENT DOCUMENTS

| 3,836,344 | A | * | 9/1974 | Krawitz et al. ............ 48/211 |
| 3,922,148 | A | * | 11/1975 | Child ........................ 48/197 R |
| 3,958,957 | A | | 5/1976 | Koh |
| 4,124,628 | A | | 11/1978 | McRobbie |
| 4,133,825 | A | | 1/1979 | Stroud |
| 4,199,327 | A | * | 4/1980 | Hempill et al. ............ 48/202 |
| 4,650,814 | A | * | 3/1987 | Keller ........................ 518/703 |
| 6,669,744 | B2 | * | 12/2003 | Allam et al. ............... 48/127.9 |
| 7,125,913 | B2 | | 10/2006 | Pan et al. |
| 7,247,281 | B2 | | 7/2007 | Jahnke et al. |
| 2003/0000214 | A1 | * | 1/2003 | Grewe et al. ............... 60/670 |
| 2007/0033949 | A1 | * | 2/2007 | Raybold et al. ............ 60/780 |
| 2008/0016769 | A1 | | 1/2008 | Pearson |
| 2008/0190024 | A1 | * | 8/2008 | Hobbs ........................ 48/76 |
| 2010/0011664 | A1 | | 1/2010 | Ariyapadi |
| 2010/0074839 | A1 | * | 3/2010 | Drnevich et al. ......... 423/655 |

FOREIGN PATENT DOCUMENTS

WO    WO2009019497    2/2009

OTHER PUBLICATIONS

PCT Search Report issued in connection with corresponding WO Patent Application No. US11/26257 filed on Feb. 25, 2011.

* cited by examiner

*Primary Examiner* — Walter D Griffin
*Assistant Examiner* — Huy-Tram Nguyen
(74) *Attorney, Agent, or Firm* — Fletcher Yoder, P.C.

(57) ABSTRACT

In an embodiment, a system includes a methanation section generally including a fuel inlet configured to receive a first fuel, a fuel outlet configured to output methane, and a first fuel path configured to route a first flow of the first fuel from the fuel inlet to the fuel outlet. The first fuel path includes a first methanator configured to generate the methane from the first fuel in an exothermic methanation region. The system also includes a second fuel path configured to route a second flow of a second fuel without conversion to methane. The second fuel path is also configured to receive heat from the exothermic methanation region.

20 Claims, 9 Drawing Sheets

SYSTEM FOR HEAT INTEGRATION WITH METHANATION SYSTEM

BACKGROUND OF THE INVENTION

The subject matter disclosed herein relates to new methods and systems directed towards heat integration in substitute natural gas production and integrated gasification combined cycle (IGCC) plants.

With the volatile prices of natural gas, gasification processes which produce Substitute Natural Gas (SNG) from coal, coke, or any carbonaceous feed are highly desirable. In general, SNG production involves gasification of a carbonaceous feed to produce an untreated syngas product which includes carbon monoxide (CO) and hydrogen ($H_2$), among other products. The syngas is treated and then converted to methane in a methanator reactor.

In general, integrated gasification combined cycle (IGCC) power plants are capable of generating energy from various carbonaceous feedstocks similar to those in SNG production plants, such as coal, relatively cleanly and efficiently. In a similar manner to SNG production, IGCC technology may convert the carbonaceous feedstock into a gas mixture of CO and $H_2$, i.e., syngas, by reaction with oxygen and steam in a gasifier. These gases may be treated, processed, and utilized as fuel in a conventional combined cycle power plant. For example, the syngas may be fed into a combustion turbine of the IGCC power plant and ignited to power the gas turbine for use in the generation of electricity.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a methanation section generally including a fuel inlet configured to receive a first fuel, a fuel outlet configured to output methane, a first fuel path configured to route a first flow of the first fuel from the fuel inlet to the fuel outlet, wherein the first fuel path includes a first methanator configured to generate the methane from the first fuel in an exothermic methanation region. The system may also include a second fuel path configured to route a second flow of a second fuel without conversion to methane, wherein the second fuel path is configured to receive heat from the exothermic methanation region.

In a second embodiment, a system includes a syngas cooler, a methanation section, a fuel path extending through the syngas cooler and the methanation section, wherein the fuel path is configured to flow a syngas from the syngas cooler to the methanation section, and the methanation section is configured to generate methane from the syngas in a first exothermic methanation region. The system also includes a fluid path extending through the syngas cooler and the methanation section, wherein the syngas cooler is configured to transfer heat from the syngas to a fluid along the fluid path. The methanation section is configured to transfer heat from the first exothermic methanation region to the fluid along the fluid path, and the fluid may be steam along at least a portion of the fluid path.

In a third embodiment, a system includes a methanation section which generally includes a fuel path, a first methanator in the fuel path, wherein the first methanator includes a first exothermic methanation region, a second methanator in the fuel path downstream from the first methanator, wherein the second methanator includes a second exothermic methanation region. The methanation section also includes a first heat exchanger disposed along the fuel path between the first and second methanators, a second heat exchanger disposed along the fuel path downstream from the second methanator, and a fluid path extending through the first and second heat exchangers, wherein the second heat exchanger is configured to transfer heat from the second exothermic methanation region to a fluid to generate a saturated steam along the fluid path prior to delivery to the first heat exchanger. The first heat exchanger is configured to transfer heat from the first exothermic methanation region to the saturated steam to generate a superheated steam along the fluid path.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed towards enhanced steam and/or heat recovery within substitute natural gas (SNG) production and integrated gasification combined cycle (IGCC) power generation systems. Based on given implementation-specific plant requirements, a methanation section may be used for the generation of superheated high pressure steam that may be used to power turbines or other steam-driven equipment. In general, the conversion of syngas to SNG is a highly exothermic reaction. The heat produced in this process poses a great challenge for reactor and plant design, and is a potential source for driving various processes. For example, the heat generated by the production of SNG from CO and $H_2$ gas, hereinafter referred to as methanation, may be on the order of 50 kcal/gmol of CO converted, representing roughly 20 percent of the total energy input into a methanation reaction (in the form of stored energy from CO and $H_2$). That is, the actual syngas collected may represent 80 percent of the total input of energy, with the other 20 percent being underutilized in typical configurations. Present embodiments describe various ways of utilizing this exothermic heat released during the conversion of syngas to SNG to produce superheated steam and/or to facilitate the conversion of fuel into net power produced by the plant. Depending upon the type of technology, process requirements and design constraints, a skilled practitioner may select any one or a combination of these and related approaches to generate power for powering various areas of a plant or to export a power surplus.

Figure 1:
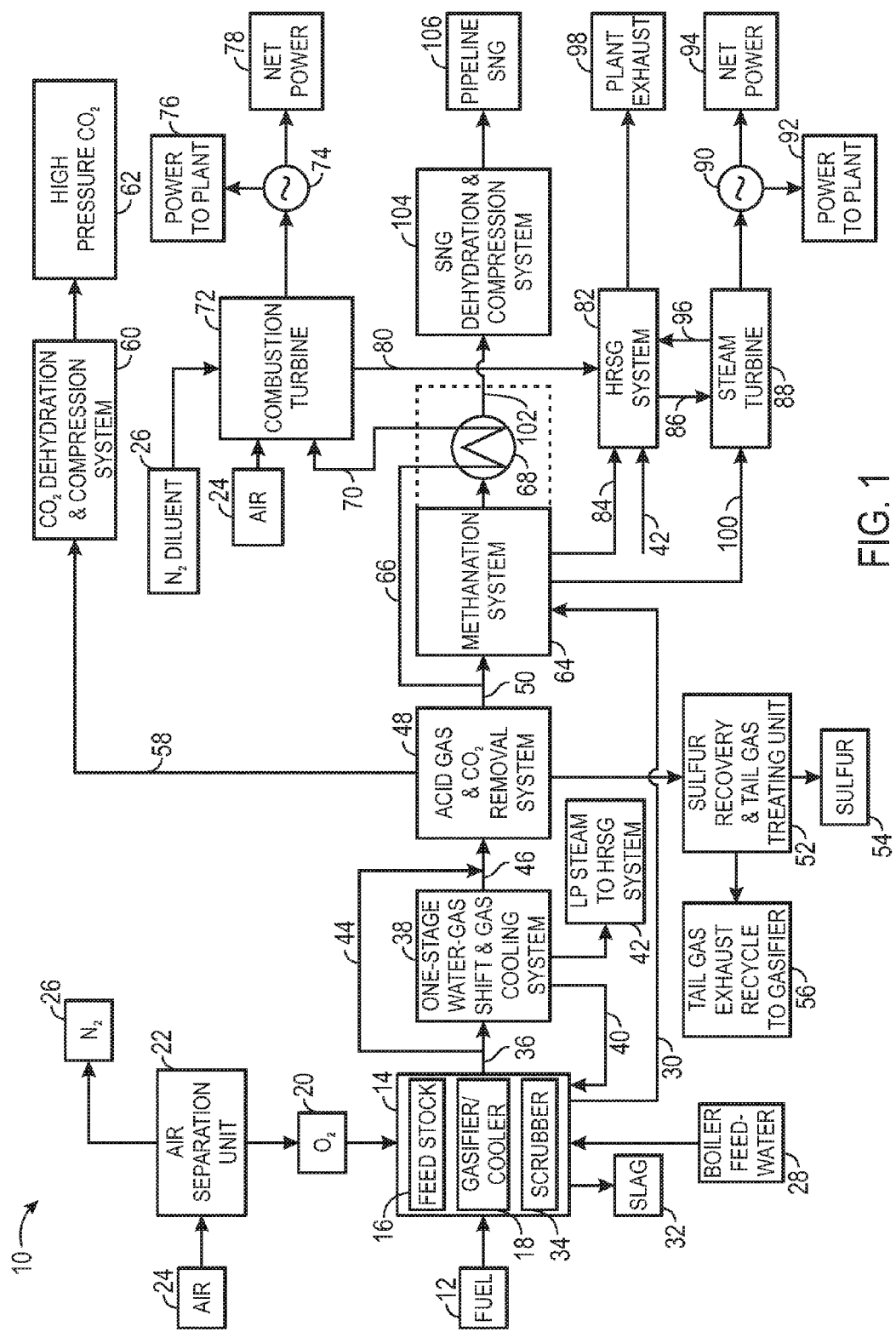
FIG. 1 is a block diagram illustrating an embodiment of a plant for producing substitute natural gas and generating power utilizing the unique heat integration features described herein.

FIG. 1 illustrates a block diagram of an integrated substitute natural gas (SNG) production-IGCC system 10 using a methanation section 64 to generate superheated high-pressure steam 100 and heated syngas 70 in accordance with the disclosed embodiments. System 10 includes, among other features, areas for generating SNG as well as using syngas (a SNG intermediate) as a fuel source for the generation of power. Elements of the system 10 may include a carbonaceous fuel source 12, such as a solid feed, that may be utilized as a source of energy and/or for the production of SNG. The fuel source 12 may include coal, petroleum coke, biomass, wood-based materials, agricultural wastes, tars, coke oven gas and asphalt, or other carbon containing items. The solid fuel of the fuel source 12 may be passed to a feedstock, gasification, and scrubbing system 14. The feedstock, gasification, and scrubbing system 14 may include several subsystems. For example, the feedstock, gasification, and scrubbing system 14 may include a feedstock preparation subsystem 16 that may, for example, resize or reshape the fuel source 12 by chopping, milling, shredding, pulverizing, briquetting, or pelletizing the fuel source 12 to generate feedstock. Additionally, water, or other suitable liquids may be added to the fuel source 12 in the feedstock preparation subsystem 16 to create slurry feedstock. In other embodiments, no liquid is added to the fuel source in the feedstock preparation subsystem 16, thus yielding dry feedstock.

The feedstock may be passed to a gasifier/cooler 18 of the feedstock, gasification, and scrubbing system 14 from the feedstock preparation subsystem 16. The gasifier/cooler 18, in the depicted embodiment and for the purposes of the present discussion is a syngas cooler (SGC) gasifier, which may convert the feedstock into a combination of CO and $H_2$, i.e., syngas. This conversion may be accomplished by subjecting the feedstock to a controlled amount of steam and oxygen at elevated pressures, e.g., from approximately 20 bar to 85 bar, and temperatures, e.g., approximately 700° C.-1600° C., depending on the type of gasifier utilized in the gasifier/cooler 18. In the depicted embodiment, the gasifier/cooler 18 is a SGC gasifier that operates between about 400 pounds per square inch gauged (PSIG) and about 800 PSIG (e.g., about 400, 450, 500, 550, or 600 PSIG). The gasification process may also include the feedstock undergoing a pyrolysis process, whereby the feedstock is heated. Temperatures inside the gasifier of the gasifier/cooler 18 may range from approximately 150° C. to 700° C. during the pyrolysis process, depending on the fuel source 12 utilized to generate the feedstock. For example, the temperature may be about 150, 200, 250, 300, 350, 400, 450, 500, 550, 600, 650, or 700° C. The heating of the feedstock during the pyrolysis process may generate a solid, e.g., char, and residue gases, e.g., CO, $H_2$, and nitrogen ($N_2$). The char remaining from the feedstock after the pyrolysis process may weigh up to approximately 40% to 50% of the weight of the original feedstock (e.g., about 40, 41, 42, 43, 44, 45, 46, 47, 48, 49, or 50%).

A combustion process may then occur in the gasifier/cooler 18. To aid with this combustion process, oxygen 20 may be supplied to the gasifier/cooler 18 from an air separation unit (ASU) 22. The ASU 22 may operate to separate air 24 into component gases by, for example, distillation techniques that may be cryogenic or may utilize pressure swing adsorption (PSA). For example, ASU 22 may separate the air 24 into oxygen 20 for delivery to the gasifier/cooler 18 and nitrogen 26 for collection or for further use in power generation, e.g., as a diluent gas or as blending gas.

Accordingly, the oxygen 20 is received by the gasifier/cooler 18 from the ASU 22 for combustion purposes. The combustion may include introducing oxygen 20 to the char and residue gases so that the char and residue gases may react with the oxygen 20 to form $CO_2$ and CO, thus providing heat for the subsequent gasification reactions. The temperatures during the combustion process may range from approximately 700° C. to 1600° C. Next, steam may be introduced into the gasifier/cooler 18 during a gasification step. The char may react with the $CO_2$ and steam to produce CO and $H_2$ at temperatures ranging from approximately 800° C. to 1100° C. In essence, the gasifier utilizes steam and oxygen to allow some of the feedstock to be combusted to produce $CO_2$ and energy, thus driving a main reaction that converts further feedstock to $H_2$ and additional CO. In such embodiments, once the gasification reaction has begun, the energy surplus may be used to drive other processes, as described herein. For example, in embodiments where the gasifier/cooler 18 is a syngas cooler, boiler feedwater 28 may be heated by the exothermic gasification reaction to produce a stream of saturated high pressure steam 30 that may be directed to another area of the plant for further use, in effect serving to cool the syngas generated by the gasifier. In some embodiments, the saturated high pressure steam 30 may have a temperature that is between about 500 and 700 degrees Fahrenheit (e.g., greater than about 500, 550, 600, 610, 620, 630, 640, 650, or 700° F.). Further, as defined herein, the saturated high pressure steam 30 may have a pressure that is between about 800 and 2200 PSIG (e.g., greater than about 800, 900, 1000, 1100, 1200, 1300, 1400, 1500, 1600, 1700, 1800, 1900, 2000, 2100, or 2200 PSIG). The same may be true for other streams presently disclosed as a high pressure stream (e.g., high pressure feedwater or steam). The particular pressure exhibited by the saturated high pressure steam 30 may depend on a number of factors including process requirements, equipment capabilities, desired net power production, and the like.

Nevertheless, the gasifier/cooler 18 produces a gaseous product. The gaseous product may include approximately 85% of CO and $H_2$, as well as $CH_4$, HCl, HF, $NH_3$, HCN, COS and $H_2S$ (based on the sulfur content of the feedstock), which in total may be considered raw or untreated syngas. The gasifier/cooler 18 may also generate waste, such as slag 32, which in some embodiments may be a wet ash material. The slag 32 may be removed from the gasifier/cooler 18 by a scrubbing subsystem 34 of the feedstock, gasification, and scrubbing system 14. The slag 32 may be disposed of, for example, as road base, or as another building material. Additionally, the scrubbing subsystem 34 may clean the untreated syngas by removing any particulate matter from the untreated syngas, such as the wet ash.

A stream of untreated syngas 36 may then be passed to a water-gas shift (WGS) reactor 38. The WGS reactor 38 may perform a WGS reaction in which CO reacts with water (e.g. steam) to form $CO_2$ and $H_2$. Accordingly, the WGS reactor 38 may produce a condensate 40 that is recycled back to the feedstock, gasification, and scrubbing system 14. For example, the condensate 40 may be directed to the scrubber 34 for cooling purposes and scrubbing of syngas. Steam that is not used in the WGS process, for example, leftover low pressure steam 42, may be directed to a turbine via HRSG 82 for use as a working fuel. The WGS process may adjust the ratio of $H_2$ to CO in the untreated syngas 36 from approximately 1 to 1 to approximately 3 to 1 for use in the methanation process. Additionally, the WGS reactor 38 may include a bypass 44 that may be utilized to aid in proper control of the $H_2$ to CO ratio of the untreated shifted syngas. It should be noted that the WGS reactor 38 may be a sour WGS reactor, that is, sulfur may be present in the untreated syngas stream 36 into the WGS reactor 38 during the WGS reaction. Further, the WGS reactor 38 may cool the shifted syngas to facilitate gas separation processes performed in subsequent areas of the plant.

Subsequent to the WGS reaction in the WGS reactor 38, the system 10 may transmit a stream of untreated shifted syngas 46 to an acid gas and $CO_2$ removal unit 48. The acid gas and $CO_2$ removal unit 48 may scrub the untreated shifted syngas 46 (e.g., syngas product of the WGS reactor 38 and containing sulfur) to remove unwanted elements. For example, acid gases such as HCl, HF, COS, HCN, and $H_2S$ may be removed from the untreated shifted syngas 46 to generate a stream of treated syngas 50 (e.g., syngas without sulfur). Additionally, the acid gas and $CO_2$ removal unit 48 may transmit the unwanted elements of the untreated shifted syngas 46 (e.g., the HCl, HF, COS, HCN, and $H_2S$) to a sulfur recovery and tail gas treating unit 52. The sulfur recovery and tail gas treating unit 52 may separate sulfur 54 by, for example, an acid gas removal process. In this manner, the sulfur 54 may be isolated for disposal or for sale. Any remaining tail gas exhaust 56 may then be recycled to the gasifier/cooler 18.

The disclosed embodiment also may include a carbon capture system. For example, the acid gas and $CO_2$ removal unit 48 may further include a $CO_2$ removal subsystem that may strip the $CO_2$ from the treated syngas. The stripped $CO_2$ may be transmitted as a stream of $CO_2$ 58 from the acid gas and $CO_2$ removal unit 48 to a $CO_2$ dehydration and compression unit 60 that may dehydrate and compress the $CO_2$ for storage and subsequent use. For instance, this high pressure $CO_2$ 62 may be sent through a pipeline leading to one or more carbon sequestration sites, such as enhanced-oil recovery (EOR) sites or saline aquifers. Alternatively, the $CO_2$ dehydration and compression unit 60 may transmit the dehydrated and compressed $CO_2$ to, for example, a chemical plant for use therein. In one embodiment, the acid gas and $CO_2$ removal unit 48 may remove between approximately 50 and 95 percent (e.g., greater than about 50, 55, 65, 75, or 80%) of the $CO_2$ present within the syngas.

At this point, the treated syngas 50 may have approximately $H_2$/CO molar ratio of 1:1 to 4:1, $CO_2$ in between 0-10%, depending up on downstream application, and may be substantially free of sulfur compounds. Further, the treated syngas 50 is cooler than the syngas exiting the gasifier/cooler 18. For example, the WGS reactor system 38 and/or the acid gas and $CO_2$ removal system 48 may cool the syngas in a variety of processes, including heat exchange, gas expansion, and so forth. Accordingly, the treated syngas 50 may be between ambient temperature (which may vary depending upon the location of the plant) and about 150° F. In some embodiments utilizing the approaches described herein, a portion of the treated syngas 50 may be provided to a methanation section 64, for example through an inlet to the methanation section 64, while another portion bypasses the methanation section 64 through a bypass 66. As discussed below, the disclosed embodiments uniquely use the heat generated in the methanation section 64 as a heat source to generate superheated high pressure steam 100. The ratio of treated syngas 50 that is provided to the methanation section 64 and the bypass 66 may be tailored to suit plant-specific requirements, consumer demand, and heat demands for superheating steam to generate superheated high pressure steam 100. That is, the portion that is directed to the bypass 66 may be between about 10% and about 80% of the syngas 50 (e.g., about 10, 20, 30, 40, 50, 60, 70, or 80%) with the amount depending on how much substitute natural gas is desired and/or how much actual power production is needed from the system 10. In this way, the system 10 may operate as a combination of a SNG production plant and an IGCC power plant.

In the disclosed embodiment, the methanation section 64 is uniquely used as a heat source to heat the syngas flowing through the bypass 66, rather than using an external heat source. For example, the bypass 66 may lead to a heat exchanger 68, which may or may not be a part of the methanation section 64 (represented as a dashed box in the illustration). The heat exchanger 68 may use heat generated in the methanation section 64 to heat the portion of the syngas flowing through the bypass 66 to a temperature of between about 300 and 600° F. (e.g., greater than about 300, 350, 400, 450, 460, 470, 480, 500, 550, or 600° F.) to generate a stream of heated syngas 70. The stream of heated syngas 70 may then be directed to a combustion turbine 72 (e.g., gas turbine engine).

In the combustion turbine 72, the heated syngas 70 may be combusted at a much higher efficiency than the original carbonaceous fuel 12 fed into the feed subsystem 14. Air 24 may also be provided to the combustion turbine 72 to mix with the heated syngas 70 in a fuel-to-air ratio sufficient for combustion, and nitrogen 26 may be provided to the combustion turbine 72 from the ASU 22 to cool the combustion reaction and/or reduce emissions. The combustion turbine 72 may drive a variety of loads, such as an electrical generator 74 for delivery of power to the plant 76 and/or as a net power export 78. Exhaust 80 from the combustion turbine 72 may then be fed to a heat recovery and steam generation system (HRSG) 82, which may recover heat from the exhaust 80 as well as a stream of condensate 84 fed from the methanation section 64 and other process steam exports, such as the low pressure steam 42 exiting the WGS reactor system 38. Indeed, in another embodiment, the stream of saturated high pressure steam 30 may be at least partially directed to the HRSG system 82 in addition to or in lieu of the methanation section 64. The recovered heat may be used to generate steam 86 to drive a steam turbine 88, which may drive a generator 90 for power delivery to the plant 92 or as a net power export 94. A condensate 96 may be directed back to the HRSG system 82 to replenish any water used to generate steam 86. The HRSG 82 may also have an exhaust 98 through which pressure may be relieved to the atmosphere. Additionally, in the disclosed embodiments, the methanation section 64 may deliver a stream of superheated high pressure steam 100 to drive the steam turbine 88. As discussed below, the methanation section 64 is uniquely used as a superheater to generate the superheated high pressure steam 100.

As previously mentioned, the acid gas and $CO_2$ removal unit 48 may transmit a portion of the syngas 50 to the methanation section 64. The methanation section 64 may convert the CO and the $H_2$ in the syngas into $CH_4$ and $H_2O$, that is, into methane (e.g., SNG) and water in one or a series of exothermic reactions. According to some embodiments, the methanation section 64 may include one or more heat exchangers that utilize a coolant (e.g., water) to cool the hot SNG and water that is produced by the exothermic methanation reactions, which occur in each methanator within the methanation section 64. As the coolant (e.g., water) cools the methanation section 64, it becomes heated by the exothermic methanation reactions. In other embodiments, the heat produced by the exothermic methanation reaction may be used to heat other sources of water, such as sources of water and/or steam from the gasifier/cooler 18, a source of boiler feedwater, and so forth. Various implementations and designs are discussed in more detail below.

Again, the disclosed embodiments employ the methanation section 64 as a heat source, rather than an external heat source, for the generation of steam. In the illustrated embodiment, the methanation section 64 may generate high pressure superheated steam 100, which may be transmitted to the steam turbine 88 for generation of power 92, 94. The superheated high pressure steam 100 may be generated utilizing various implementations of the present technique, and may have a temperature ranging from about 700 to about 1500° F. (e.g., greater than about 700, 800, 900, 1000, 1100, 1200, 1300, 1400, or 1500° F.). In some embodiments, the temperature increase may be measured by the temperature above the saturation temperature of the steam. For example, high pressure superheated steam 100 may have a temperature above the saturation temperature of steam by about 500 to 1000° F. (e.g., greater than about 500, 600, 700, 800, 900, or 1000° F. above the saturation temperature) Likewise, the temperature increase may be measured by the percentage above the saturation temperature. Therefore, the temperature of the high pressure superheated steam 100 may be between about 10 and about 500%, or about 20 and about 300%, or about 30 and about 250%, or about 40 and about 200%, or about 50 and about 150% above the saturation temperature (e.g., greater than about 10, 50, 100, 150, 200, 250, 300, 350, 400, 450, or 500% above the saturation temperature).

Additionally, the methanation section 64 may include a sweet methanation reactor that utilizes treated syngas (e.g., sulfur has been removed from the syngas) prior to the syngas being converted into SNG and water 102. The methanation section 64 may transmit the stream of generated SNG and water 102 through an outlet to a SNG dehydration and compression unit 104. This SNG dehydration and compression unit 104 may separate the water from the SNG, so that the SNG may be compressed and transmitted to produce pipeline-grade SNG 106. The pipeline grade SNG 106 may be transmitted to storage facilities, additional SNG treatment facilities via an SNG pipeline, or may be used in any other application known in the art that utilizes pipeline SNG as a feed source.

Figure 2:
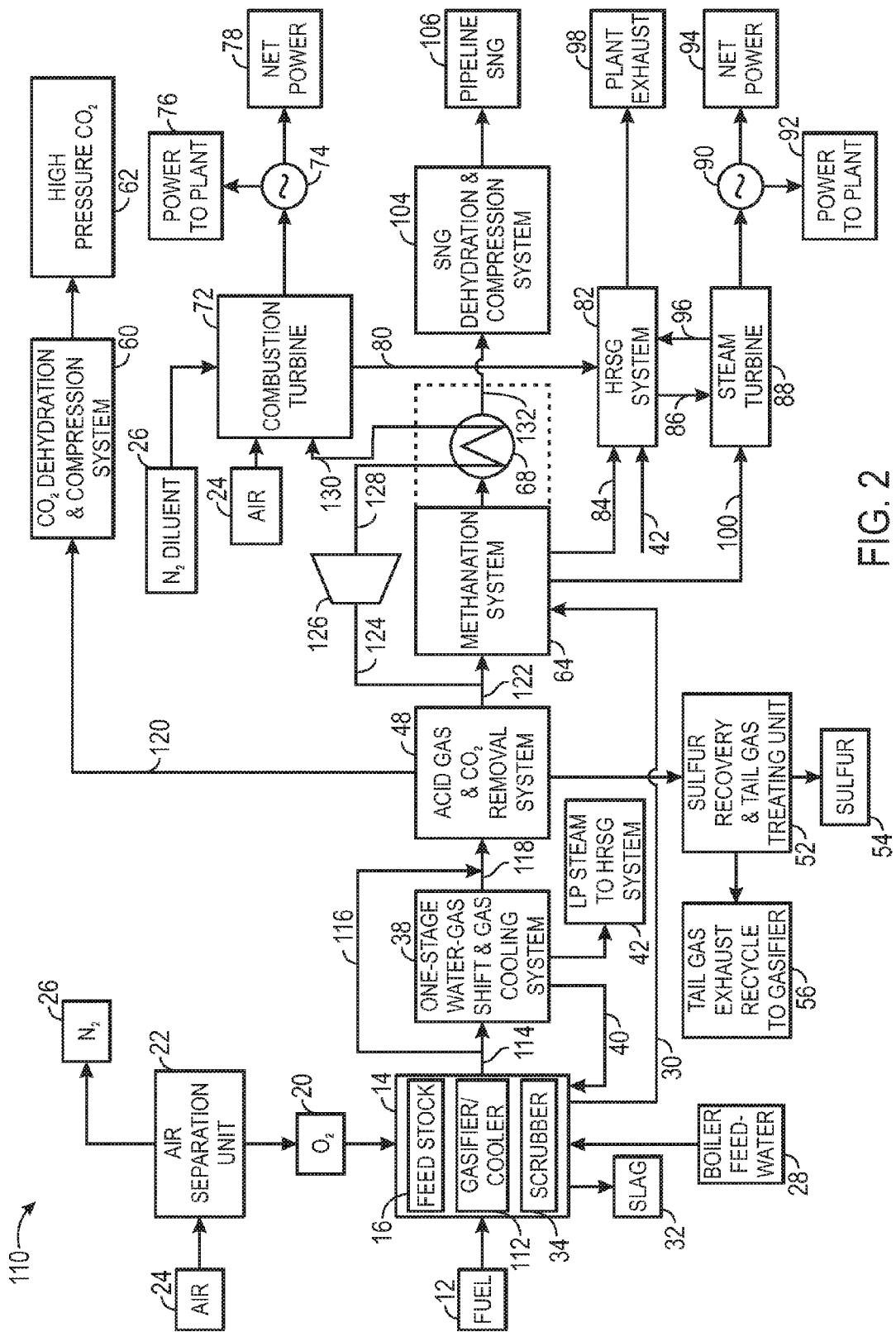
FIG. 2 is a block diagram illustrating an embodiment of a plant for producing substitute natural gas and generating power utilizing the unique heat integration features described herein.

FIG. 2 is a block diagram of another embodiment of an integrated substitute natural gas (SNG) production-IGCC system 110 using a methanation section 64 to generate superheated high pressure steam 100 and heated syngas 130 in accordance with the disclosed embodiments. The system 110 generally includes similar features as system 10 illustrated in FIG. 1. As such, similar features are discussed using the same element numbers in FIGS. 1 and 2. However, those features which perform a function under different conditions are referred to using different element numbers in the following discussion. The illustrated system 110 includes the feedstock, gasification, and scrubbing system 14, which includes a gasifier/cooler 112 which operates under different conditions than described with respect to FIG. 1. More specifically, in some embodiments, the gasifier/cooler 112 is a syngas cooler gasifier that operates at an elevated pressure and/or temperature compared to the gasifier/cooler 18 of FIG. 1. For example, the gasifier/cooler 112 may operate at pressures between about 600 PSIG and about 1000 PSIG (e.g., greater than about 650, 700, 750, 800, 850, 900, or 950 PSIG).

Accordingly, a stream of untreated syngas 114 which exits the feedstock, gasification, and scrubbing system 14 may have a higher pressure, as well. A portion of the high pressure untreated syngas 114 may be directed, as in FIG. 1, through a bypass 116 designed to handle elevated pressures. As before, the bypass 116 may serve to control the ratio of gases (e.g., ratio between $H_2$ and CO) within a stream of high pressure shifted syngas 118 which exits the WGS reactor 38. Again, the WGS reactor 38 may provide condensate 40 to the feedstock, gasification, and scrubbing system 14 as well as low pressure steam 42 to a turbine via HRSG 82. Nevertheless, the high pressure shifted syngas 118 is transported to the acid gas and $CO_2$ removal unit 48. According to one aspect of the disclosed embodiments, the process of acid gas and $CO_2$ removal may be more efficient at the higher pressures in system 110 as compared to the lower pressures in system 10. For example, in one embodiment, byproduct gases from the gasification reaction may have a higher solubility in aqueous solvents (e.g., alkanolamines dispersed in water) used for removal of the acid gases, which may lead to an increased efficiency of separation. Accordingly, the acid gas and $CO_2$ removal unit 48 may use less solvent flow in the embodiment of system 110 than the system 10, as a lower amount of solvent may be suitable to treat an equal amount of syngas. In some embodiments, the acid gas and $CO_2$ removal unit 48 of system 110 may use between about 10 and about 50% less solvent than used in system 10 (e.g., about 10, 15, 20, 25, 30, 35, 40, 45, or 50 percent less).

Once treatment of the syngas 118 has occurred, as before, byproducts from the gasification reaction (sulfur, acid gas, etc.) may be sent to the sulfur recovery and tail gas treating unit 52. Further, a stream of high pressure $CO_2$ 120 may be sent to the $CO_2$ dehydration and compression system 60, which may use less energy for compression due to the previously elevated pressure of the $CO_2$ stream 120. Upon treatment at the acid gas and $CO_2$ removal unit 48, a portion of a stream of high pressure treated syngas 122 is delivered to the methanation section 64, while a separate portion is sent through a bypass 124. The bypass 124 flows the high pressure treated syngas 122 through an expander 126. The expander 126 may, as its name suggests, expand the high pressure syngas 122 such that the pressure is reduced by a predetermined amount. In some embodiments, the pressure may be reduced from the original operating pressure of the gasifier/cooler 112 (between about 600 PSIG and 1000 PSIG) to between about 400 PSIG and about 550 PSIG (e.g., about 500 PSIG), depending upon downstream requirements. In other embodiments, the pressure drop may be measured by a percentage. For example, the pressure drop may be a drop of between approximately 10 percent and 50 percent. That is, the pressure drop may be greater than about 10, 15, 20, 25, 30, 35, 40, 45, or 50 percent. In one particular embodiment, the pressure drop may be from about 900 PSIG to about 500 PSIG (e.g., approximately 45%). Additionally, in some embodiments, the expander 126 may be an expansion turbine, which may generate power used to drive other processes. For example, the expansion turbine may drive a compressor, such as the compressor within the $CO_2$ dehydration and compression system 60.

The disclosed embodiment uniquely employs heat from the methanation section 64 to heat the syngas flowing through the bypass 124. For example, upon leaving the expander 126, a stream of reduced pressure shifted syngas 128 is then directed to heat exchanger 68. The heat exchanger 68 may be placed within or downstream from the methanation section 64, e.g., at or after a first methanation stage, second methanation stage, etc. Accordingly, the heat exchanger 68 may increase the temperature of the reduced pressure shifted syngas 128 by an amount proportional to the placement of the heat exchanger 68 within the methanation section 64. For example, if the placement of the heat exchanger 68 is towards the beginning stages of the methanation section 64, the reduced pressure shifted syngas 128 may be heated by a large amount. If the heat exchanger 68 is placed towards the end stages of the methanation section 64 (or outside of the methanation section 64), then the reduced pressure shifted syngas 128 may be heated by a lesser amount. Again, the operation of the methanation section 64 is discussed in greater detail below. Once heated, a stream of heated reduced pressure syngas 130 is directed to the combustion turbine 72, which in some embodiments may be designed to operate at a lower pressure (e.g., the pressure of the reduced pressure syngas 130). For example, the combustion turbine 72 may be designed to operate at about 400, 450, 500, 550, or 600 PSIG to produce power for the plant 76 and/or net power 78 for export.

For the portion of syngas 122 that does not bypass the methanation section 64, one or a series of methanation reactions are performed to produce high pressure SNG 132. The high pressure SNG 132 may have substantially the same pressure as the pressure of operation of the gasifier/cooler 112 (e.g., between about 600 and 1000 PSIG). For example, the high pressure SNG may have a pressure of greater than about 650, 700, 750, 800, 850, 900, or 950 PSIG. Thus, the high pressure SNG 132 may not undergo a large amount of compression within the SNG dehydration and compression system 104 to produce the pipeline SNG 106, which may have a pressure of about 1000 to 1100 PSIG.

Figure 3:
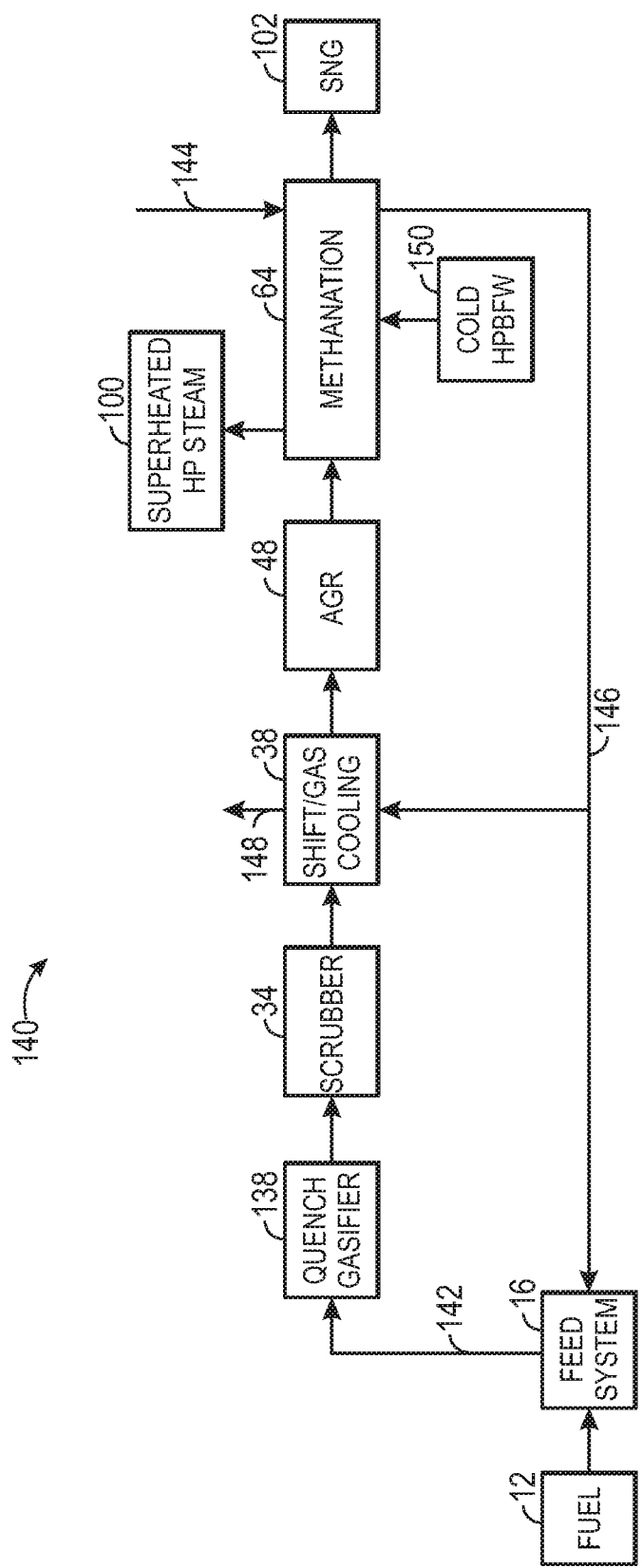
FIG. 3 is a block diagram illustrating an embodiment of a system utilizing a quench gasifier and a methanation section utilizing the unique heat integration features described herein to produce superheated high pressure steam at the methanation section.

As mentioned above, the disclosed embodiments uniquely integrate the methanation section 64 with various areas of a SNG and/or IGCC plant, such that the heat produced by the exothermic methanation processes carried out within the methanation section 64 may be harnessed to drive other plant processes. Accordingly, FIG. 3 is a block diagram of an embodiment of a system 140 having integration of the methanation section 64 with the feed subsystem 16 and/or the WGS reactor 38 in a process using a quench gasifier 138. It should be noted that system 140 is a modification of systems 10 and 110, and as such may contain similar features. As illustrated, the system 140 includes a path 142 of the carbonaceous fuel 12 that flows through the system 140. For example, the fuel undergoes quench gasification at the quench gasifier 138, cleaning at the scrubber subsystem 34, shifting and cooling at the shift reactor and gas cooling section (GC) 38, acid gas removal at the acid gas removal (AGR) section 48, and methanation at the methanation section 64 to eventually produce SNG and water 102. Such a progression may be considered the fuel path 142 of the carbonaceous fuel 12 (e.g., a first fuel path). The system 140 also includes a path of low-level heat 144 (e.g., a heat path or fluid flow). Low-level heat 144 may be heated to produce steam at one or more sections of the plant or a similar heat carrier (e.g., a warmed coolant). As the low-level heat 144 passes through the methanation section 64, it may pass through one or more heat exchangers contained within the methanation section 64 until it exits as a converted low-level heat 146, which may have a different temperature and pressure than the low-level heat 144. For example, the methanation section 64 may increase the temperature of a coolant (e.g., water or steam) by approximately 10 to 100% from low-level heat 144 to converted low-level heat 146. By further example, the methanation section 64 may convert water to steam and/or superheat steam from low-level heat 144 to converted low-level heat 146. As depicted, the converted low-level heat 146 may be directed to the feed subsystem 16 and/or the WGS reactor 38. In embodiments where the converted low-level heat 146 is directed to the feed subsystem 16, the converted low-level heat 146 may be used to heat a variety of substrates within the feed subsystem 16, such as slurry for slurry-fed gasification processes, nitrogen for dry-feed gasification processes, and so forth. Further, the converted low-level heat 146 may serve as a source of steam used in the WGS reactor 38, which, as mentioned, uses steam to react with CO to form $CO_2$ and water. A stream of leftover condensate and/or low-level steam 148 may exit the WGS reactor 38 to be either recycled or delivered to another section of the plant.

Figure 4:
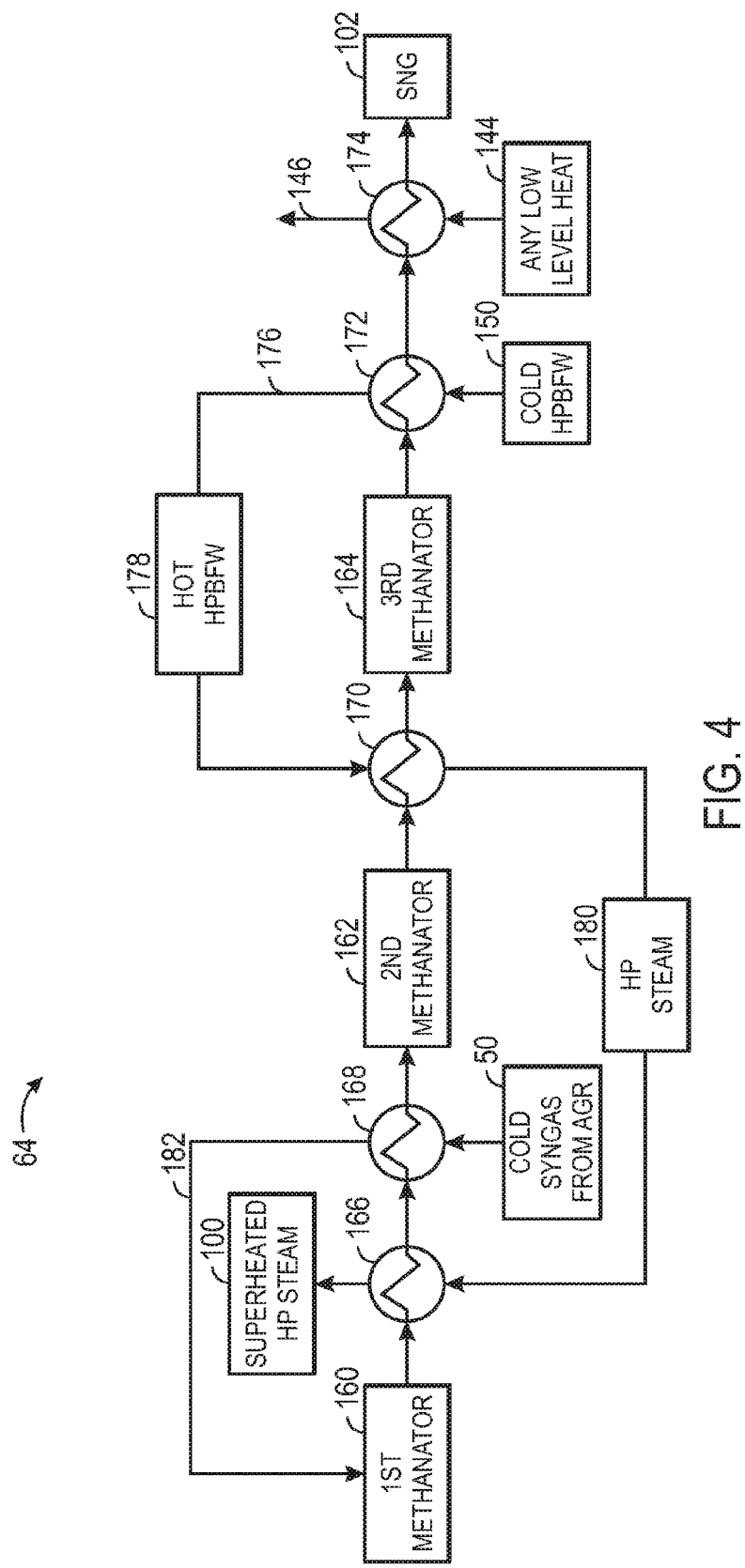
FIG. 4 is a block diagram illustrating the methanation section of FIG. 3, which utilizes the unique heat integration features described herein to produce superheated high pressure steam.

In a similar manner to the low-level heat 144, a source of cold high pressure boiler feedwater (HPBFW) 150 may be provided to the methanation section 64 to generate superheated high pressure steam 100. The superheated high pressure steam 100 may be directly used in one or a series of steam turbines (e.g., steam turbine 88) as well as in heat exchange implementations. To illustrate the operation of the methanation section 64 in further detail, FIG. 4 is a block diagram illustrating an embodiment of heat integration according to the approaches described herein. In particular, FIG. 4 is an illustration of an embodiment where the methanation section 64 is used to generate high pressure superheated steam 100 from the high pressure cold boiler feedwater (HPBFW) source 150 by directing the path of the water through a series of heat exchangers proximate to methanators of the methanation section 64.

Accordingly, FIG. 4 illustrates a series of methanators including a first methanator 160, a second methanator 162, and a third methanator 164 disposed along the carbonaceous fuel path 142. It should be noted that there may be any number of methanators within the methanation section 64, and that three methanators are described herein as one particular implementation. Further, in a general sense, the methanators may generally be disposed along the carbonaceous fuel path 142 in order of decreasing exothermicity. That is, the first methanator 160 may generate a large amount of heat from the exothermic conversion of syngas to SNG in relation to the other methanators 162, 164 within the methanation section 64. In one embodiment, this may be due to the first methanator 160 converting a large amount of syngas to a large amount of SNG, with the leftover (unconverted) syngas being converted to SNG in the second and third methanators 162, 164. As such, the first methanator 160 may produce the most heat, with the second methanator 162 producing the second most heat, and so forth.

Using the current techniques, a number of heat exchangers may be contained within and/or adjacent to the methanation section 64 such that the heat generated by each methanator may be used to drive various processes. More specifically, the heat exchangers may be disposed proximate and/or within an exothermic methanation region of each methanator. In the illustrated embodiment, a first heat exchanger 166 is disposed proximate to and immediately downstream from the first methanator 160 along the carbonaceous fuel path 142, e.g., proximate and/or within an exothermic methanation region of the first methanator 160. A second heat exchanger 168 may be disposed along the carbonaceous fuel path 142 between the first heat exchanger 166 and the second methanator 162. Likewise, a third heat exchanger 170 is disposed along the carbonaceous fuel path 142 in between the second methanator 162 and the third methanator 164 proximate and/or within an exothermic methanation region of the second methanator 162. In a similar manner to the heat exchangers 166, 168 proximate the first methanator 160, fourth and fifth heat exchangers 172 and 174 may be disposed along the carbonaceous fuel path 142 proximate to and immediately downstream from the third methanator 164. Therefore, the methanators 160, 162 and 164 and the heat exchangers 166, 168, 170, 172 and 174 may all be disposed along the carbonaceous fuel path 142, which may allow the heat exchangers to utilize the heat generated by each methanator to increase the temperature of a coolant (e.g., steam, syngas, SNG), a fuel (e.g., syngas, steam, SNG), or another flow. As mentioned, as the heat generated by the methanators 160, 162, and 164 generally decreases along the progression of the carbonaceous fuel path 142, so may the ability of the heat exchangers 166 through 174 to heat a fluid. That is, the first heat exchanger 166 proximate the first methanator 160 may heat a fluid to a higher temperature (or by a greater percentage) than the fifth heat exchanger 174 proximate the third methanator 164, and so forth.

In the configuration illustrated, in addition to being disposed along the carbonaceous fuel path 142, the heat exchangers 166 through 174 may also be disposed along a fluid path 176, e.g., a water/steam path or a coolant path. Indeed, in some embodiments, the fluid path 176 may be a high pressure (e.g., between about 800 and 2200 PSIG) water-steam path configured to carry the cold high pressure boiler feedwater 150 through the series of heat exchangers 166 through 174 to generate superheated high pressure steam 100. That is, the fluid path 176 may also be a coolant path and/or a fuel path.

According to the embodiment depicted in FIG. 4, the fluid path 176 may travel in a generally opposing direction in relation to the carbonaceous fuel path 142. In other words, as the fuel flows downstream along the fuel path 142 successively through the methanators 160, 162, and 164, the fluid flows upstream along the fluid path 176 through the heat exchangers 172, 170, and 166. Thus, the fluid path 176 may successively intersect the carbonaceous fuel path 142 at the positions of the fourth, third, and first heat exchangers 172, 170, and 166, adjacent to the third, second, and first methanators 164, 162, and 160, which are successively hotter than one another in the upstream direction. In this manner, fluid contained within the fluid path 176 (which may be defined as a fluid entrained within a conduit) may be heated to a first temperature in the fourth heat exchanger 172, a second temperature in the third heat exchanger 170, and a third temperature in the first heat exchanger 166, wherein the first, second, and third temperatures are successively hotter than one another.

In some embodiments, the fourth heat exchanger 172 may heat the cold high pressure boiler feedwater 150 by a temperature between about 200 and 600° F. (e.g., about 200, 250, 300, 350, 400, 450, 500, 550, or 600° F.). The hot high pressure boiler feedwater 178 may then be passed to the third heat exchanger 170 between the second and third methanators 162, 164 to generate high pressure steam 180. The third heat exchanger 170 may be configured to heat the hot high pressure boiler feedwater 178 by between about 600 and 900° F. (e.g., 600, 650, 700, 750, or 800° F.). As depicted in FIG. 4, the high pressure steam 180 is then directed to the first heat exchanger 166 proximate the first methanator 160. The first heat exchanger 166 is configured to heat the high pressure steam 180 to a temperature between about 1200 and 1500° F. (e.g., 1200, 1250, 1300, 1350, 1400, 1450, or 1500° F.). It should be noted that the terms first, second, third, fourth, and fifth with regard to the heat exchangers 166 through 174 are merely used to facilitate discussion, and are not necessarily representative of the order that a fluid may pass through the heat exchangers. Indeed, in embodiments where the heat exchangers are described in order of fluid flow according to the embodiment depicted in FIG. 4, the fourth heat exchanger 172 would be the first heat exchanger which heats a high pressure fluid, the third heat exchanger 170 would be the second, the first heat exchanger 166 would be the third, and so forth. Further, the presence of five heat exchangers in the embodiment depicted in FIG. 4 is merely included to facilitate discussion, and configurations using more or less than five heat exchangers (e.g., one, two, three, four or more) are also contemplated, as described below.

Using the present techniques, one or more heat exchangers may be used to facilitate the processes performed within the methanation section 64. For example, after plant start-up (i.e. after an initial input of energy), the methanation process of converting syngas to SNG may be a power-producing process. As such, in addition to generating superheated high pressure steam 100, the methanation section 64 may also have features configured to heat fuel used in the methanation process (i.e., syngas) and to warm the final product of the methanation section 64 (i.e. SNG). In the illustrated embodiment, the second and fifth heat exchangers 168 and 174 may be configured to perform these tasks. In one implementation, the cold syngas 50 from the acid gas and $CO_2$ removal unit 48 may be heated by the second heat exchanger 168 using the heat not utilized by the first heat exchanger 166. Accordingly, the second heat exchanger 168 may heat the syngas 50 to a temperature between about 500 and 600° F. (e.g., about 500, 510, 520, 530, 540, 550, 560, 570, 580, 590, or 600° F.). In doing so, a stream of heated syngas 182 may be delivered to the first methanator 160, which may facilitate the start of the methanation reaction and/or increase the efficiency of the methanation reaction. In a similar fashion, the low-level heat 144 which, as mentioned, may be low pressure steam or a similar fluid, may be further heated or cooled by the fifth heat exchanger 174 to produce converted low-level heat 146 and/or to warm or cool the SNG and water 102 produced by the methanation section 64. In such an embodiment, any process utilizing the SNG and water 102 may be facilitated (e.g., combustion, compression and/or dehydration).

Figure 5:
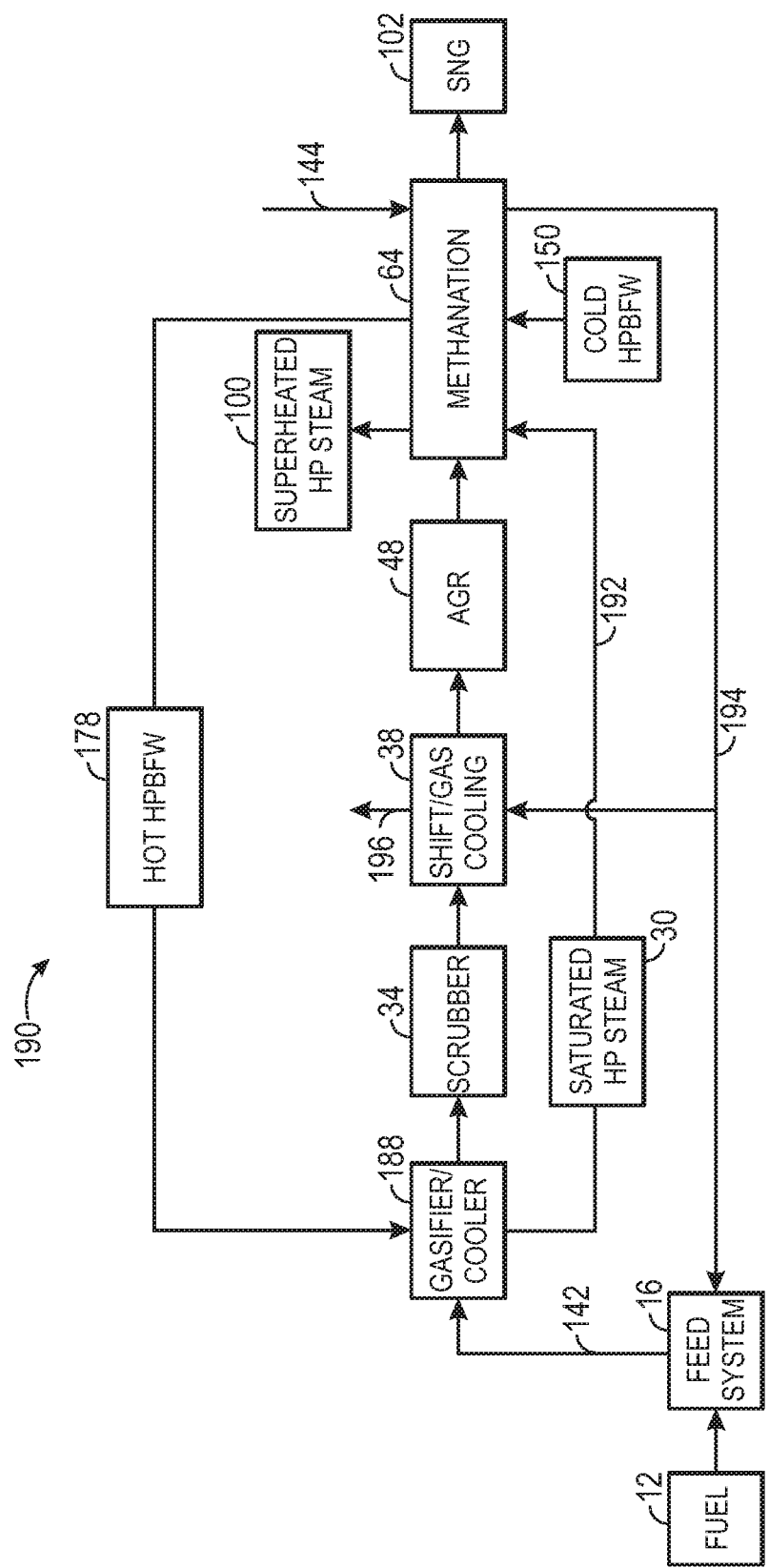
FIG. 5 is a block diagram illustrating an embodiment of an integration of a syngas cooler with a methanation section utilizing the unique heat integration features described herein to recover exothermic heat at the syngas cooler to produce superheated high pressure steam at the methanation section.

FIG. 5 is a block diagram of an embodiment of a system 190 with a unique heat integration of a syngas cooler/gasifier 188 and the methanation section 64. For example, the illustrated system 190 uniquely integrates the gasifier 188 and the methanation section 64 to generate superheated high pressure steam 100, while also using the methanation section 64 as a heat source for other flows (e.g., low-level heat 144). System 190 includes the carbonaceous fuel path 142, which delivers the fuel 12 through the feed subsystem 16 and to a syngas cooler/gasifier (SGC gasifier) 188. The SGC gasifier 188 generates syngas for the eventual production of SNG 102. According to certain embodiments, the SGC gasifier 188 may produce a stream of saturated high pressure steam 30 described with respect to FIG. 1. The saturated high pressure steam 30 may be generated, for example, from the cooling process when the syngas is first produced in the gasifier. More specifically, a source of water is used to cool the syngas produced in the SGC gasifier 188, which in turn is converted to the saturated high pressure steam 30. In system 190, this saturated high pressure steam 30 is directed to the methanation section 64 along a fluid path 192 to produce the superheated high pressure steam 100. The source of water which is used for cooling in the SGC gasifier 188 may be hot high pressure boiler feedwater (HPBFW) 178, which is delivered along the fluid path 192 from the methanation section 64 to the SGC gasifier 188. Of course, the hot boiler feedwater 178 may initially be in the form of cold high pressure boiler feedwater (HPBFW) 150 as a source delivered to the methanation section 64.

Further, in the illustrated embodiment, the low-level heat 144 may flow though a series of heat exchangers to generate a stream of low pressure steam 194, which may be provided to a number of areas within the system 190. For example, the steam 194 may be directed to the shift reactor 38, where the steam 194 may be utilized in the shift reaction or as a warmer or coolant, resulting in the generation of a new stream of low-level heat 196. The steam 194 may also be provided to the feed system 16 to generate a heated and/or slurried feed for the SGC gasifier 188. Therefore, by integrating the SGC gasifier 188 with the methanation section 64 via the fluid path 192, the illustrated embodiment produces superheated high pressure steam 100 while simultaneously improving efficiencies of gasification and methanation. For example, by using steam 194 to heat and/or slurry the feed to the SGC gasifier 188, the SGC gasifier 188 may generate syngas using less energy than would otherwise be used if the feed were not modified by the steam 194.

Figure 6:
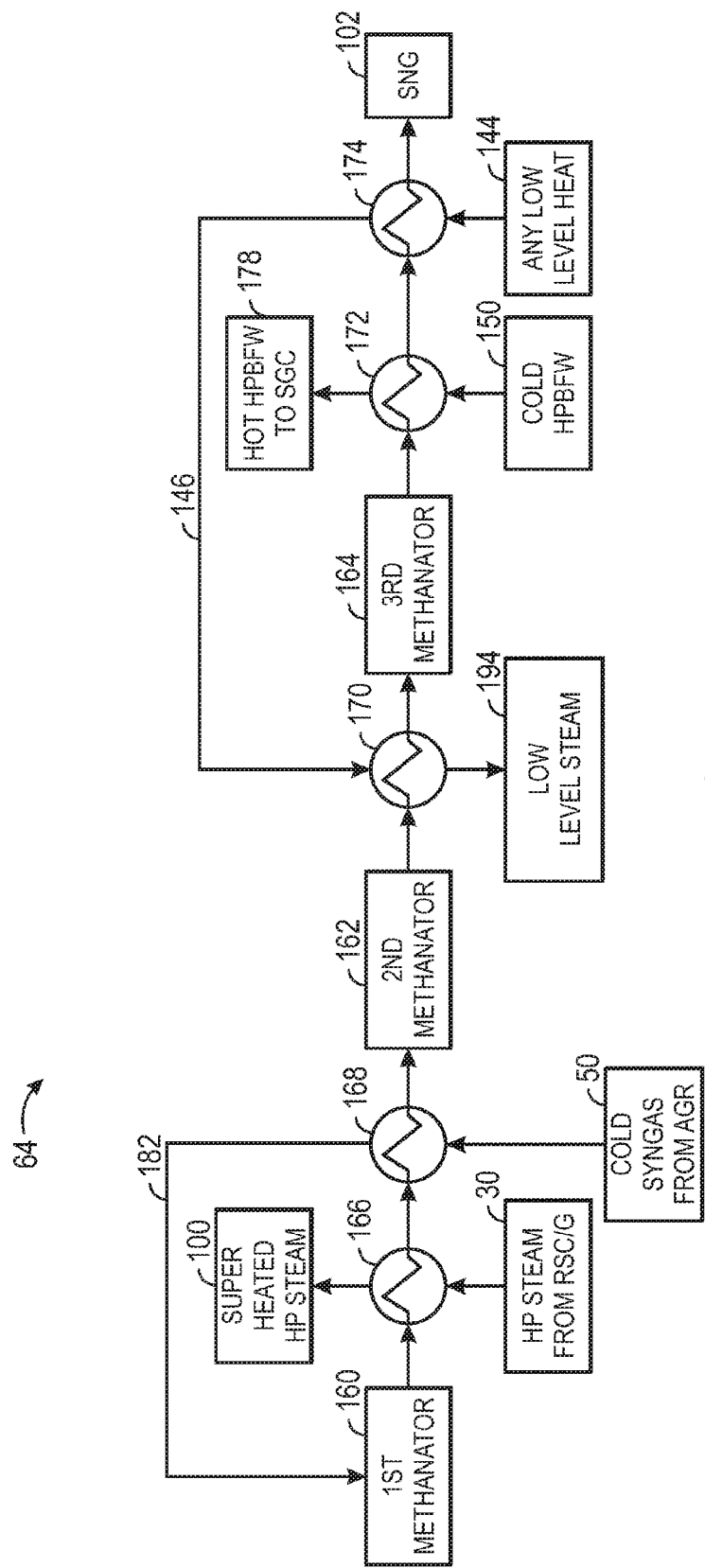
FIG. 6 is a block diagram illustrating the methanation section of FIG. 5, which utilizes the unique heat integration features described herein to produce superheated high pressure steam.

An embodiment of the methanation section 64 of FIG. 5 is illustrated in further detail in the block diagram of FIG. 6. The methanation section 64 of FIG. 6 includes, among other features, the first, second, and third methanators 160, 162, and 164, as well as the heat exchangers 166 through 174 along the fuel path 142. In the illustrated embodiment of heat integration, in a similar manner to the embodiment depicted in FIG. 4, the fourth heat exchanger 172 receives and heats the source of cold high pressure boiler feedwater 150 to produce hot high pressure boiler feedwater (HPBFW) 178. However, unlike the embodiment depicted in FIG. 4, the hot high pressure boiler feedwater 178 is delivered to the SGC gasifier 188 for further heating along the fluid path 192 (FIG. 5). Thus, in addition to its above-described purpose, the SGC gasifier 188 may also act as a heat exchanger to heat the high pressure hot boiler feedwater 178 to produce saturated high pressure steam 30. As mentioned, the fluid path 192 circulates between the methanation section 64 and the SGC gasifier 188. As such, the saturated high pressure steam 30 from the SGC gasifier 188 is delivered to the first heat exchanger 166, which generates the superheated high pressure steam 100 for eventual delivery to a steam turbine or other plant equipment.

Further depicted in FIG. 6 is a different path of what originates as the low-level heat 144. As before in FIG. 4, the low-level heat 144 is delivered to the fifth heat exchanger 174, which warms or cools the SNG and water 102 (depending on desired product or plant specifications) to produce converted low-level heat 146. However, in the illustrated embodiment, rather than delivery to another area of the plant, the converted low-level heat 146 is delivered to the third heat exchanger 170, where it is heated to generate the low-level steam 194. This low-level steam 194 may then be delivered to other sections of the plant to facilitate a number of processes including those that use steam as a coolant, a reactant, a warming agent, low-pressure steam turbines, expanders, dehydrators, feed warmers, and so forth.

Figure 7:
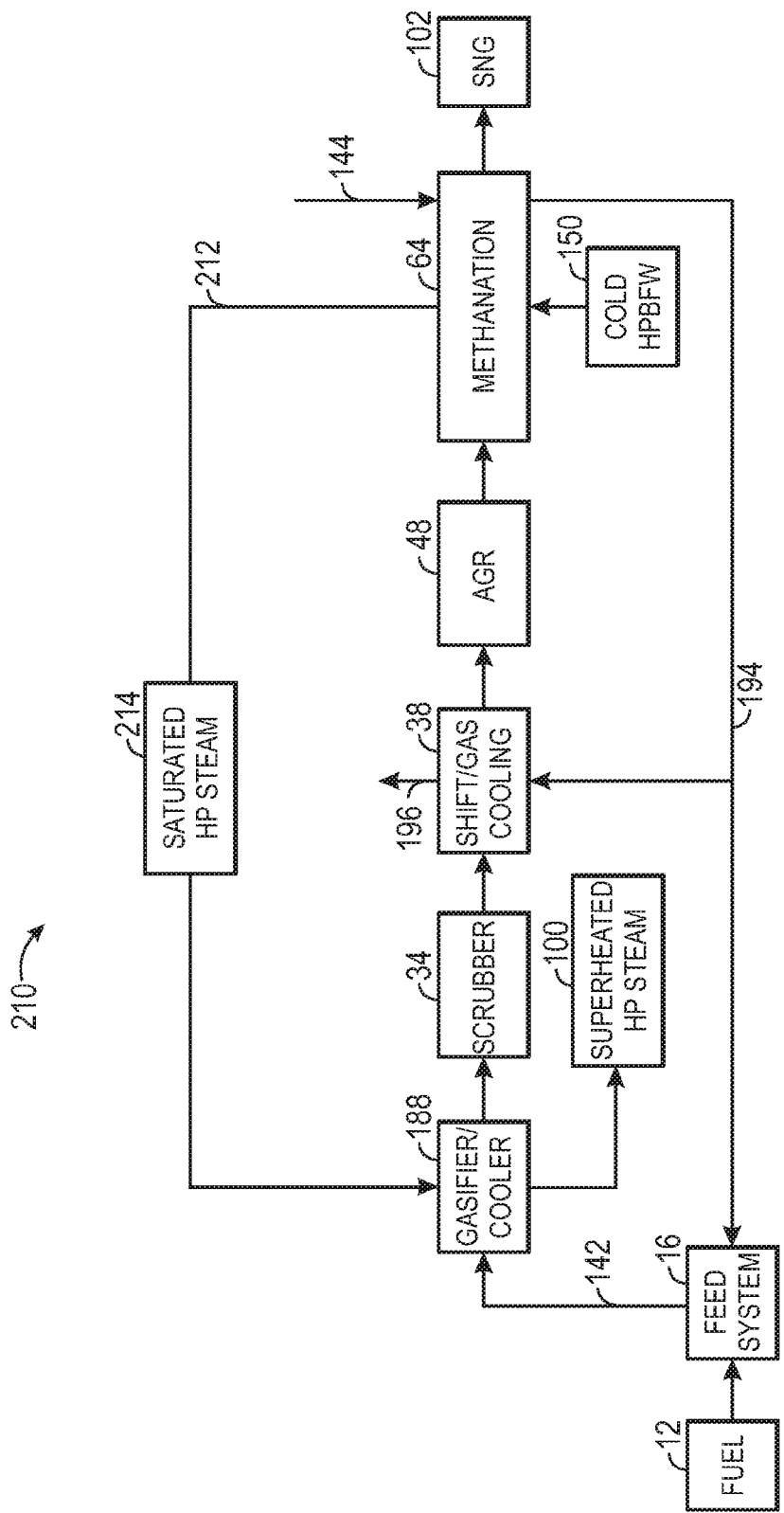
FIG. 7 is a block diagram illustrating another embodiment of an integration of a syngas cooler with a methanation section utilizing the unique heat integration features described herein to recover exothermic heat at the syngas cooler to produce superheated high pressure steam.

A modification of the embodiment depicted in FIG. 5 is illustrated as a block diagram in FIG. 7, where a system 210 utilizes a different fluid path 212 to generate the superheated high pressure steam 100 at the syngas cooler gasifier 188. It should be noted that in order to produce superheated high pressure steam 100 at the syngas cooler gasifier 188, the SGC gasifier 188 may undergo design modifications to contain the temperatures and pressures of the superheated high pressure steam 100. As depicted, system 210 utilizes the fluid path 212 to carry what originates as the cold high pressure boiler feedwater (HPBFW) 150 through the methanation section 64 to generate a stream of saturated high pressure steam 214, which may or may not be similar in temperature and pressure to the saturated high pressure steam 30 of FIG. 5. The saturated high pressure steam 214 is delivered to the SGC gasifier 188, for example, to cool the syngas generated in the SGC gasifier 188 and to produce the superheated high pressure steam 100. Additionally, the low-level steam 194 may be directed to the WGS reactor 38, which may utilize the steam 194 in the WGS reaction and/or as a coolant to produce the low-level heat source 196. The steam 194 may also be utilized by the feed system 16, as mentioned above, to heat and/or slurry feed that is sent to the SGC gasifier 188.

Figure 8:
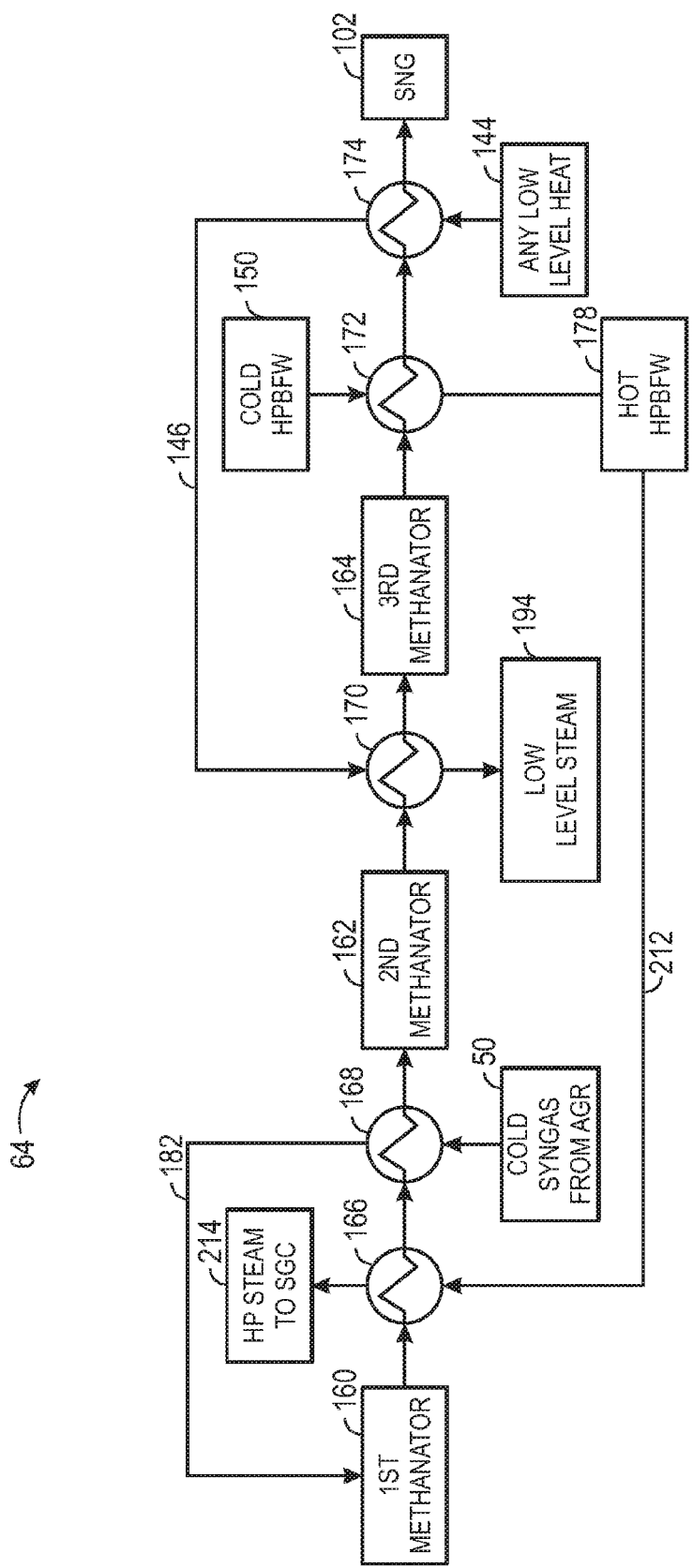
FIG. 8 is a block diagram illustrating the methanation section of FIG. 7, which utilizes the unique heat integration features described herein to produce high pressure steam.

The heat integration scheme within the methanation section of FIG. 7 is depicted in greater detail in the block diagram of FIG. 8. As in the above descriptions, the methanation section 64 includes the carbonaceous fuel path 142 having the methanators 160, 162, and 164 and the heat exchangers 166 through 174. According to the illustrated embodiment, the cold high pressure boiler feedwater (HPBFW) 150 is heated at the fourth heat exchanger 172 to generate hot high pressure boiler feedwater (HPBFW) 178. The hot high pressure boiler feedwater 178 moves along the fluid path 212 until it reaches the first heat exchanger 166, where it is heated to generate high pressure steam 214, which, as mentioned, is further heated at the SGC gasifier 188 to produce superheated high pressure steam 100.

As before, low-level steam 194 is generated by passing low-level heat 144 (e.g., water) through the fifth heat exchanger 174 (concomitantly heating or cooling the SNG) to produce converted low-level heat 146 (e.g., heated water). The converted low-level heat 146 is then heated at the third heat exchanger 170 to produce the low-level steam 194. Again, according to the embodiment depicted in FIG. 7, low-level steam 194 is directed to the WGS reactor 38 for use in the WGS reaction. However, embodiments are also contemplated where the low-level heat 144 and/or the converted low-level heat 146 may be superheated to produce superheated low pressure. Other possible implementations may include using the low-level steam 194 in a reboiler, such as a reboiler in an acid gas reactor.

Figure 9:
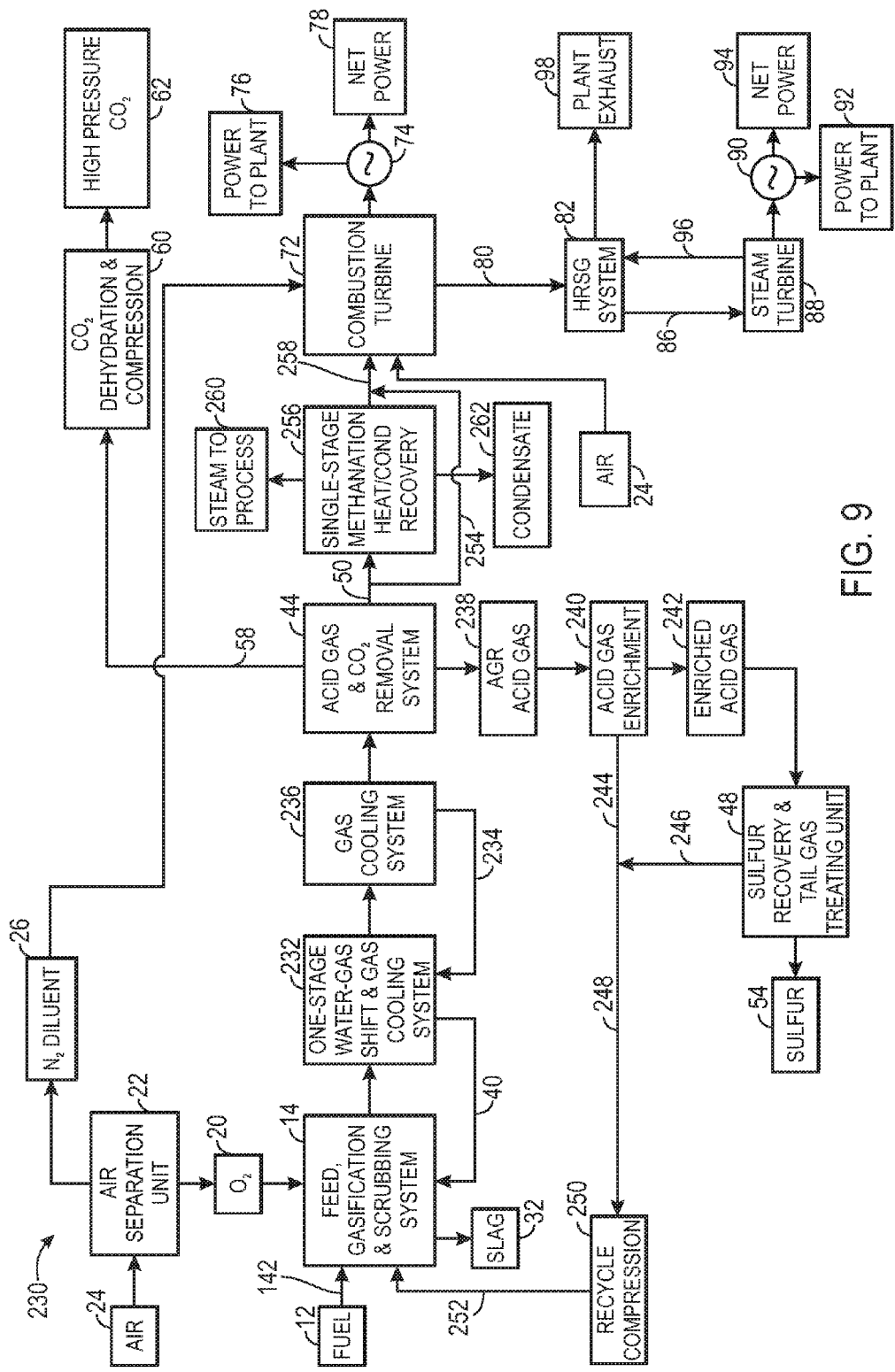
FIG. 9 is a block diagram illustrating an integrated gasification combined cycle power plant utilizing an embodiment of the unique heat integration features described herein to generate power from a heated syngas source.

FIG. 9 is a block diagram of an embodiment of a system 230 with heat integration using the present approaches. In the illustrated embodiment, the system 230 includes similar features to systems 10 and 110, and contains features configured to heat syngas without the use of heat exchangers for the production of exportable power and/or substitute natural gas. The system 230 includes features similar to those described within FIGS. 1 and 2, including the feed, gasification, and scrubbing system 14. Accordingly, the fuel 12 is converted into an untreated syngas, which is passed to a one-stage water-gas shift (WGS) reactor and heat/condensate recovery system 232. In a similar manner to the WGS reactor 34, the system 232 may convert a portion of the CO within the syngas to $CO_2$. The system 232 may also recover condensate 234 from a gas cooling system 236, which may use steam and/or a similar coolant to cool a shifted syngas. As with systems 10 and 110, the WGS reactor and heat/condensate recovery system 232 may also transfer the condensate 40 to the feed, gasification, and scrubbing system 14. The gas cooling system 236 may be configured to cool a shifted syngas produced by the system 232 using a coolant, such as a boiler feedwater, which produces the condensate 234. The gas cooling system 236 produces a cooled gas (i.e. a cooled syngas) that is directed to the acid gas and $CO_2$ removal system 44, which separates a stream of acid gas 238 from the cooled syngas. The acid gas 238 is provided to an acid gas enrichment section 240, which separates acid gas from $CO_2$ to produce a stream of enriched acid gas 242 and a $CO_2$ slip stream 244. The enriched acid gas 242 is then directed to the sulfur recovery and tail gas treating unit 48 to separate sulfur 54 and tail gas 246, which is combined with the $CO_2$ slip stream 244 to produce a stream of recycled gas 248. The stream of recycled gas 248 may be compressed at a recycle compression unit 250 to a pressure substantially equal to that of the operating ranges of the gasifier 18 within the feed, gasification, and scrubbing system 14. The pressurized recycled gas stream 252 may then be provided to the feedstock, gasification, and scrubbing system 14 for further use.

As the treated syngas 50 exits the acid gas and $CO_2$ removal system 44, a portion may enter a bypass 254, which bypasses a single-stage methanation section 256. According to certain embodiments, the amount of syngas 50 that enters the bypass 254 may vary between about 0 to about 100 percent. That is, anywhere from substantially none to substantially all of the syngas 50 may enter the bypass 254. For example, the bypass 254 may flow approximately 10 to 90, 20 to 80, 30 to 70, or 40 to 60 percent of the syngas 50, while the remaining syngas flows through the single-stage methanation section 256. In some embodiments, the bypass 254 may flow approximately 25, 25, 45, 55, 65, 75, 85, or 95 percent of the syngas 50, with the remaining portion being converted to methane in the single-stage methanation section 256. As previously mentioned with regard to the methanation section 64 of FIGS. 1-8, the process of converting syngas to SNG may be a highly exothermic process, with heat generation sufficient to increase the temperature of a fluid at a heat exchanger by anywhere from 200 to 2000° F. However, with regard to system 230, the heated SNG produced by the single-stage methanation section 256 may be directly combined, for example at a joining of two conduits, with the syngas 50 in the bypass 254 to produce a mixed stream 258. The mixed stream 258 may include a combination of SNG and syngas, depending on the amount of syngas 50 bypassing the methanation section 256.

In one implementation of the depicted embodiment, about 10 to 20 percent of the syngas 50 may be directed into the bypass 254, which may be heated upon contacting hot SNG exiting the single-stage methanation section 256. For example, the syngas may be heated to a temperature between about 400 and about 1500° F. (e.g., about 600, 700, 800, 900, 1000, 1100, 1200, 1300, 1400, or 1500° F.). Therefore, by directly mixing the hot SNG with the syngas, the illustrated embodiment produces a heated mixture of fuel (stream 258), which is then directed to the combustion turbine 72 for the generation of plant power 76 and power for export 78. Utilizing such a configuration, the combustion turbine 72 may operate more efficiently relative to combustion with an unheated fuel. Additionally, it should be noted that the combustion turbine 72 may be in fluid connection with the heat recovery steam generator 82 in a manner consistent with the embodiments depicted in FIGS. 1 and 2. As a result of performing the exothermic methanation reaction, the single-stage methanation section 256 may also generate steam 260 and condensate 262. Steam 260 may be utilized in a manner consistent with the embodiments depicted in FIGS. 1 and 2. For example, the steam 260 may be used in a steam turbine or in heat exchange implementations. Likewise, the condensate 262 may be directed to the HRSG system 82 and/or recycled to other areas of the plant.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a methanation section, comprising:
a fuel inlet configured to receive a first fuel;
a fuel outlet configured to output methane;
a first fuel path configured to route a first flow of the first fuel from the fuel inlet to the fuel outlet, wherein the first fuel path comprises a first methanator configured to generate the methane from the first fuel in an exothermic methanation region, and
a second fuel path configured to route a second flow of a second fuel without conversion to methane, wherein the second fuel path is configured to receive heat from the exothermic methanation region.

2. The system of claim 1, wherein the first fuel and the second fuel comprise a syngas, the first fuel path and the second fuel path are coupled together upstream of the exothermic methanation region, and the second fuel path bypasses the exothermic methanation region.

3. The system of claim 2, wherein the first flow of the first fuel comprises a first portion of the syngas, the second flow of the second fuel comprises a second portion of the syngas, and the first portion is at least greater than or equal to approximately 75 percent of the syngas.

4. The system of claim 3, comprising a heat exchanger downstream from the exothermic methanation region, wherein the heat exchanger is configured to transfer the heat from the exothermic methanation region to the second fuel.

5. The system of claim 2, wherein the first flow of the first fuel comprises a first portion of the syngas, the second flow of the second fuel comprises a second portion of the syngas, and the first portion is at least less than or equal to approximately 25 percent of the syngas.

6. The system of claim 5, wherein the first fuel path and the second fuel path are coupled together at a fuel mixing region downstream from the exothermic methanation region, and the fuel mixing region is configured to mix the methane directly with the second fuel.

7. The system of claim 2, wherein the second fuel path comprises a gas expansion turbine.

8. The system of claim 1, comprising a gasifier coupled to the first or second fuel path upstream from the methanation section, wherein the gasifier comprises a quench cooler or a radiant syngas cooler.

9. The system of claim 1, comprising a fluid path coupled to the methanation section, wherein the methanation section is configured to transfer heat to a fluid along the fluid path to produce a heated fluid, the heated fluid is routed to a heat recovery steam generation (HRSG) system, and the heated fluid comprises heated water, steam, or superheated steam.

10. A system, comprising:
a gasifier configured to generate a syngas from a fuel source, wherein the gasifier comprises a syngas cooler configured to cool the syngas generated within the gasifier with a fluid;
a methanation section;
a fuel path extending through the syngas cooler and the methanation section, wherein the fuel path is configured to flow the syngas from the syngas cooler to the methanation section, and the methanation section is configured to generate methane from the syngas in a first exothermic methanation region; and
a fluid path configured to flow the fluid and extending through the syngas cooler and the methanation section, wherein the syngas cooler is configured to transfer heat from the syngas to the fluid along the fluid path, the methanation section is configured to transfer heat from the first exothermic methanation region to the fluid along the fluid path, and the fluid comprises steam along at least a portion of the fluid path.

11. The system of claim 10, wherein the syngas cooler or the methanation section is configured to superheat the steam.

12. The system of claim 10, wherein the syngas cooler is configured to transfer heat from the syngas to the fluid to generate a saturated steam, and the methanation section is configured to transfer heat from the first exothermic methanation region to the saturated steam to generate a superheated steam.

13. The system of claim 12, wherein the methanation section comprises a first methanator having the first exothermic methanation region, a second methanator having a second exothermic methanation region, and a first heat exchanger between the first methanator and the second methanator, wherein the first heat exchanger is configured to transfer heat from the first exothermic methanation region to the saturated steam to generate the superheated steam.

14. The system of claim 13, wherein the methanation section comprises a second heat exchanger between the first methanator and the second methanator, wherein the second heat exchanger is configured to transfer heat from the first exothermic methanation region to the syngas prior to delivery to the first methanator.

15. The system of claim 13, wherein the methanation section comprises a third methanator having a third exothermic methanation region, and a second heat exchanger downstream of the third methanator, wherein the second heat exchanger is configured to transfer heat from the third exothermic methanation region to the fluid to generate a heated feedwater prior to delivery to the syngas cooler.

16. The system of claim 10, wherein the methanation section is configured to transfer heat from the first exothermic methanation region to the fluid to generate a saturated steam, and the syngas cooler is configured to transfer heat from the syngas to the saturated steam to generate a superheated steam.

17. The system of claim 16, wherein the methanation section comprises a first methanator having the first exothermic methanation region, a second methanator having a second exothermic methanation region, and a first heat exchanger between the first methanator and the second methanator, wherein the first heat exchanger is configured to transfer heat from the first exothermic methanation region to the fluid to generate the saturated steam.

18. The system of claim 17, wherein the methanation section comprises a second heat exchanger between the first methanator and the second methanator, wherein the second heat exchanger is configured to transfer heat from the first exothermic methanation region to the syngas prior to delivery to the first methanator.

19. A system, comprising:
a methanation section, comprising:
a fuel path;
a first methanator in the fuel path, wherein the first methanator comprises a first exothermic methanation region;
a second methanator in the fuel path downstream from the first methanator, wherein the second methanator comprises a second exothermic methanation region;
a first heat exchanger disposed along the fuel path between the first and second methanators;
a second heat exchanger disposed along the fuel path downstream from the second methanator; and
a fluid path extending through the first and second heat exchangers, wherein the second heat exchanger is configured to transfer heat from the second exothermic methanation region to a fluid to generate a saturated steam along the fluid path prior to delivery to the first heat exchanger, and the first heat exchanger is configured to transfer heat from the first exothermic methanation region to the saturated steam to generate a superheated steam along the fluid path.

20. The system of claim 19, wherein the methanation section comprises:
a third methanator in the fuel path downstream from the second methanator, wherein the third methanator comprises a third exothermic methanation region; and
a third heat exchanger disposed along the fuel path downstream from the third methanator, wherein the fluid path extends through the first, second, and third heat exchangers, and the third heat exchanger is configured to transfer heat from the third exothermic methanation region to the fluid to generate a heated feedwater along the fluid path prior to delivery to the second heat exchanger.

* * * * *